United States Patent
Nilsson

(10) Patent No.: US 10,277,364 B2
(45) Date of Patent: Apr. 30, 2019

(54) EARLY HARQ PACKET RETRANSMISSION

(71) Applicant: Telefonaktiebolaget LM Ericsson (publ), Stockholm (SE)

(72) Inventor: Johan Nilsson, Hollviken (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 139 days.

(21) Appl. No.: 15/307,817

(22) PCT Filed: Mar. 25, 2015

(86) PCT No.: PCT/EP2015/056346
§ 371 (c)(1),
(2) Date: Oct. 29, 2016

(87) PCT Pub. No.: WO2016/150493
PCT Pub. Date: Sep. 29, 2016

(65) Prior Publication Data
US 2017/0070317 A1    Mar. 9, 2017

(51) Int. Cl.
*H04J 3/00* (2006.01)
*H04L 1/18* (2006.01)
(Continued)

(52) U.S. Cl.
CPC .......... *H04L 1/1816* (2013.01); *H04L 1/0002* (2013.01); *H04L 1/0006* (2013.01);
(Continued)

(58) Field of Classification Search
CPC ..... H04L 1/1816; H04L 1/002; H04L 1/0009; H04L 1/0026; H04L 1/1819;
(Continued)

(56) References Cited

U.S. PATENT DOCUMENTS

2009/0003257 A1    1/2009    Kumar et al.
2009/0042558 A1    2/2009    Shen et al.
(Continued)

FOREIGN PATENT DOCUMENTS

EP    1903747 A1    3/2008
EP    2557724 A1    2/2013
(Continued)

OTHER PUBLICATIONS

Nakamura et al., Pre-Repeat Selective-Repeat ARQ in Fading Channel, Universal Personal Communications, 1998. ICUPC '98. IEEE 1998 International Conference on Florence, Italy Oct. 5-9, 1998, Oct. 5, 1998; Oct. 5, 1998-Oct. 9, 1998 New York, NY, USA,IEEE, US, 2, 1253-1257.
(Continued)

*Primary Examiner* — Sai Ming Chan
(74) *Attorney, Agent, or Firm* — Leffler Intellectual Property Law, PLLC

(57) ABSTRACT

A method is disclosed of a first device for wireless communication adapted to communicate with a second device for wireless communication over a communication channel in accordance with a hybrid automatic repeat request (HARQ) protocol. The method comprises receiving a first signal from the second device over the communication channel, estimating a first quality of the communication channel based on the received first signal, and transmitting a HARQ packet to the second device over the communication channel, wherein a transmission format of the HARQ packet is based on the estimation of the first quality. The method also comprises receiving a second signal from the second device over the communication channel, estimating a second quality of the communication channel based on the received second signal, and determining whether a deterioration between the first quality and the second quality exceeds a (Continued)

quality deterioration threshold. If the deterioration exceeds the quality deterioration threshold, the method comprises retransmitting the HARQ packet to the second device over the communication channel before reception of a response message associated with the HARQ packet is expected. Corresponding computer program product, arrangement and wireless communication device are also disclosed.

19 Claims, 2 Drawing Sheets

(51) Int. Cl.
*H04L 1/00* (2006.01)
*H04L 5/22* (2006.01)

(52) U.S. Cl.
CPC .......... *H04L 1/0009* (2013.01); *H04L 1/0026* (2013.01); *H04L 1/1812* (2013.01); *H04L 1/1819* (2013.01); *H04L 1/1825* (2013.01); *H04L 1/1854* (2013.01); *H04L 1/1887* (2013.01); *H04L 1/1893* (2013.01); *H04L 5/22* (2013.01)

(58) Field of Classification Search
CPC ... H04L 1/1854; H04L 1/1887; H04L 1/1893; H04L 5/22; H04L 1/006; H04L 1/1812; H04L 1/1825

USPC .......................................................... 370/280
See application file for complete search history.

(56) References Cited

U.S. PATENT DOCUMENTS

| 2010/0195629 | A1 | 8/2010 | Chen et al. | |
|---|---|---|---|---|
| 2010/0322177 | A1* | 12/2010 | Luo | H04L 1/189 |
| | | | | 370/329 |
| 2013/0343273 | A1* | 12/2013 | Barbieri | H04L 1/1822 |
| | | | | 370/328 |
| 2015/0139000 | A1* | 5/2015 | Matin | H04W 24/10 |
| | | | | 370/252 |
| 2017/0163387 | A1* | 6/2017 | Tabet | H04L 1/1825 |

FOREIGN PATENT DOCUMENTS

| WO | 0070813 | A1 | 11/2000 |
|---|---|---|---|
| WO | 2006065188 | A1 | 6/2006 |
| WO | 2009136829 | A1 | 11/2009 |
| WO | 2013184053 | A1 | 12/2013 |

OTHER PUBLICATIONS

International Search Report dated Feb. 3, 2016 in connection with International Application No. PCT/EP2015/056346, 8 pages.
Written Opinion dated Feb. 3, 2016 in connection with International Application No. PCT/EP2015/056346, 10 pages.

* cited by examiner

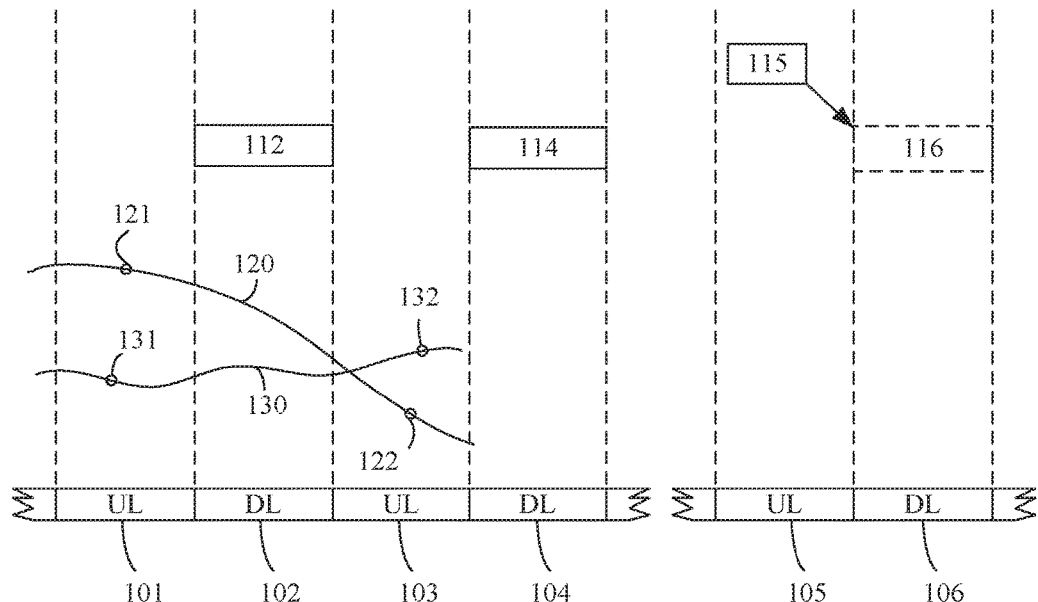
FIG. 1
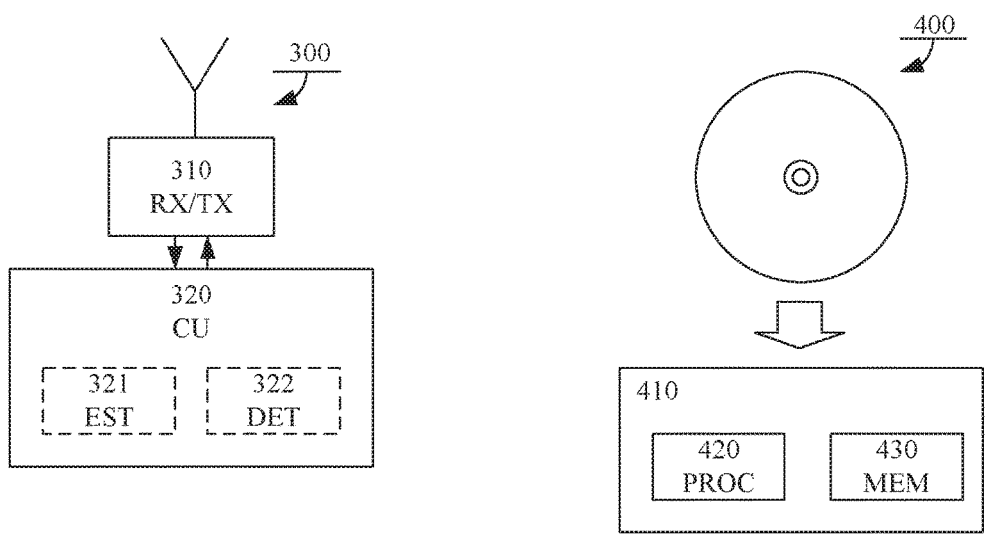
FIG. 3
FIG. 4

EARLY HARQ PACKET RETRANSMISSION

TECHNICAL FIELD

The present invention relates generally to the field of hybrid automatic repeat request (HARQ) protocols. More particularly, it relates to timing of HARQ packet retransmission.

BACKGROUND

Hybrid automatic repeat request (HARQ) is a well known and widely used approach for mitigating disturbances of transmissions over various types of communication channels. For example, HARQ is applied to some signaling according to the communication standards advocated by the Third Generation Partnership Project (3GPP).

Different communication applications may have different latency requirements. Furthermore, different communication applications may, additionally or alternatively, have different requirements on reliability.

In a typical example (e.g. according to 3GPP), a control loop of a base station may strive to keep an error rate metric (e.g. a BLock Error Rate—BLER) at a predefined target value. The control loop may, for example, regulate the error rate metric towards the target value by adapting a transmission format (e.g. one or more of a modulation type, a coding rate, a block size, etc.). The target value is often chosen to optimize system throughput while accepting a number of retransmissions.

A typical BLER target value when HARQ is applied is 10%, which means that (on the average) 9 of 10 blocks will be delivered with low latency, since no retransmission is needed for those blocks.

However, 1 of 10 blocks (on the average) will be erroneous (i.e. not considered delivered) at the first reception, and at least one retransmission is needed for delivery of these blocks which increases the average latency.

The retransmitted blocks will have a much larger end-to-end delay than blocks that do not need retransmission due to the slow HARQ process involving signaling between the receiving unit and the transmitting unit. For applications with low latency requirements, frequently appearing HARQ retransmissions might not be acceptable.

If the delivery time for these blocks can be shortened, the average latency will be decreased. Furthermore, if the delivery time for these blocks can be shortened applications that are delay sensitive (e.g. having low latency requirements) may be handled using this approach.

"Pre-repeat selective-repeat ARQ in fading channel" by Nakamura, et al., IEEE Proceedings of International Conference on Universal Personal Communications, 1998 (ICUPC '98), Florence, Italy, Oct. 5-9, 1998, New York, N.Y., USA, pp. 1253-1257 discloses a selective-repeat ARQ scheme using a pre-repeat technique. Occurrence of errors in transmitted frames is predicted by observing errors in received frames when TDMA-TDD (time division multiple access, time division duplex) is employed. When error detection in a received slot predicts error in a previous transmitted slot, the content of the previous transmitted slot is pre-repeated.

A drawback with the approach disclosed in Nakamura, et al, is that a conclusion that a previously transmitted frame will reach its destination in error, where the conclusion is based on an erroneously received frame, may not be completely adequate in all scenarios. This may lead to unnecessary retransmissions (pre-repetitions), which may adversely affect throughput. Alternatively or additionally, it may lead to missed instances of transmitted frames in error, which may result in that normal retransmissions (non-pre-repetitions) will be applied and the delivery time will not be shortened.

Thus, there is a need for improved approaches that shorten the delivery time for blocks that need retransmission for correct delivery.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

In this description, the term "HARQ packet" is used both for the first transmission and for retransmissions of a packet in accordance with a HARQ protocol.

It is an object of some embodiments to solve or mitigate at least some of the above or other disadvantages.

According to a first aspect, this is achieved by a method of a first device for wireless communication adapted to communicate with a second device for wireless communication over a communication channel in accordance with a hybrid automatic repeat request (HARQ) protocol.

The first device may, for example be abase station or similar. The second device may, for example, be a wireless communication terminal such as a user equipment (UE).

The method comprises receiving a first signal from the second device over the communication channel, estimating a first quality of the communication channel based on the received first signal and transmitting a HARQ packet to the second device over the communication channel, wherein a transmission format of the HARQ packet is based on the estimation of the first quality.

The method also comprises receiving a second signal from the second device over the communication channel, estimating a second quality of the communication channel based on the received second signal and determining whether a deterioration between the first quality and the second quality exceeds a quality deterioration threshold.

If the deterioration exceeds the quality deterioration threshold, the method comprises retransmitting the HARQ packet to the second device over the communication channel before reception of a response message associated with the HARQ packet is expected.

The first and second quality may be estimated in terms of any suitable quality metric. According to some embodiments, such quality metrics include, but are not limited to, received power, received signal strength indicator (RSSI), reference signal received power (RSRP), reference signal received quality (RSRQ), received signal code power (RSCP), signal-to-interference ratio (SIR), and signal-to-interference-and-noise ratio (SINR).

The transmission format may specify one or more of a modulation type, a coding rate, and a block size according to some embodiments.

The second signal may, in some embodiments, be received during a time window extending from the reception of the first signal (or from the transmission of the HARQ packet) to the expected reception of the response message associated with the HARQ packet. In some embodiments, the second signal is received during a time window for reception immediately following the transmission of the HARQ packet.

In some embodiments, the retransmission of the HARQ packet is performed during a next available time window for transmission following the reception of the second signal. According to some embodiments, the retransmission of the HARQ packet is performed during a time window for transmission immediately following the reception of the second signal.

The response message associated with the HARQ packet may, in some embodiments, be a HARQ response message comprising an acknowledgement (ACK) or a non-acknowledgement (NAK) of the HARQ packet.

The quality deterioration threshold may be static or dynamic.

In some embodiments, determining whether a deterioration between the first quality and the second quality exceeds a quality deterioration threshold comprises determining the deterioration as the first quality minus the second quality and comparing the result to the quality deterioration threshold.

A first example value of the quality deterioration threshold may be defined as a relative deterioration between the first and second quality (e.g. the first quality minus the second quality being compared with a threshold value of x % of the first quality, where x may be static or dynamic).

A second example value of the quality deterioration threshold may be defined by a dB value (e.g. the first quality minus the second quality, expressed in dB being compared with a threshold value of x dB, where x may be static or dynamic).

A third example value of the quality deterioration threshold may be defined as an absolute deterioration between the first and second quality (e.g. the first quality minus the second quality being compared with a threshold value of x, where x may be static or dynamic).

A dynamic threshold value may, in some embodiments, be defined based on a current state or mode of a process that is controlled by data transmitted via the HARQ protocol.

According to some embodiments, the method may further comprise receiving the response message if the deterioration does not exceed the quality deterioration threshold. If the response message comprises a non-acknowledgement, the method may comprise retransmitting the HARQ packet to the second device over the communication channel after reception of the response message. If the response message comprises an acknowledgement, the method may comprise establishing the HARQ packet as delivered.

In some embodiments, at least one of the received first and second signals may comprise a measurement signal. A measurement signal may be a signal transmitted from the second device for the purpose of measurements by the first device. The measurement signal may, for example, be a reference signal (e.g. a pilot signal) and/or may comprise dummy data.

The communication channel may, according to some embodiments, be a frequency interval in a time division multiplex (TDD) system with channel reciprocity.

A second aspect is a method of a second device for wireless communication adapted to communicate with a first device for wireless communication over a communication channel in accordance with a hybrid automatic repeat request (HARQ) protocol.

The method comprises receiving a transmitted HARQ packet from the first device over the communication channel and determining whether a transmission is scheduled over the communication channel before transmission of a response message associated with the transmitted HARQ packet is scheduled.

If no transmission is scheduled over the communication channel before transmission of the response message is scheduled, the method comprises transmitting a measurement signal to the first device over the communication channel for estimation by the first device of a quality of the communication channel.

The measurement signal may, according to some embodiments, be for estimation by the first device of a second quality of the communication channel to determine whether a deterioration between a first quality, estimated b r the first device before transmission of the HARQ packet, and the second quality exceeds a quality deterioration threshold.

In some embodiments, the quality deterioration threshold may define whether the first device retransmits the HARQ packet to the second device over the communication channel before reception of a response message associated with the HARQ packet is expected by the first device.

The measurement signal may, in some embodiments, be transmitted during a time window extending from the reception of the HARQ packet to the scheduled transmission of the response message associated with the HARQ packet. In some embodiments, the measurement signal is transmitted during a time window for transmission immediately following the reception of the HARQ packet.

The measurement signal of the second aspect may correspond to the second signal of the first aspect according to some embodiments.

In some embodiments, the method may further comprise (if a retransmitted version of the HARQ packet is received before the response message associated with the transmitted HARQ packet is scheduled) discarding the response message associated with the transmitted HARQ packet and transmitting a response message associated with the retransmitted version of the HARQ packet. If no retransmitted version of the HARQ packet is received before the response message associated with the transmitted HARQ packet is scheduled, the method may comprise transmitting the scheduled response message associated with the retransmitted version of the HARQ packet.

The response message associated with the (retransmitted version of the) HARQ packet may, in some embodiments, be a HARQ response message comprising an acknowledgement (ACK) or a non-acknowledgement (NAK) of the (retransmitted version of the) HARQ packet—typically depending on a decoding result (e.g. a cyclic redundancy check result) of the (retransmitted version of the) HARQ packet.

A third aspect is a computer program product comprising a computer readable medium, having thereon a computer program comprising program instructions. The computer program is loadable into a data-processing unit and adapted to cause execution of the method according to any of the first and second aspect when the computer program is run by the data-processing unit.

A fourth aspect is an arrangement of a first device for wireless communication adapted to communicate with a second device for wireless communication over a communication channel in accordance with a hybrid automatic repeat request (HARQ) protocol.

The arrangement comprises a receiver, a transmitter and a control unit.

The receiver is adapted to receive a first signal from the second device over the communication channel, the control unit is adapted to estimate a first quality of the communication channel based on the received first signal, and the transmitter is adapted to transmit a HARQ packet to the second device over the communication channel, wherein a transmission format of the HARQ packet is based on the estimation of the first quality.

The receiver is further adapted to receive a second signal from the second device over the communication channel after transmission of the HARQ packet.

The control unit is further adapted to estimate a second quality of the communication channel based on the received second signal and determine whether a deterioration between the first quality and the second quality exceeds a quality deterioration threshold.

The transmitter is further adapted to, if the deterioration exceeds the quality deterioration threshold, retransmit the HARQ packet to the second device over the communication channel before reception of a response message associated with the HARQ packet is expected.

The control unit may, according to some embodiments, comprise a quality estimator adapted to estimate the first and second qualities.

The control unit may, according to some embodiments, comprise a determiner adapted to determine whether the deterioration between the first quality and the second quality exceeds the quality deterioration threshold.

In some embodiments, the receiver may be further adapted to receive the response message if the deterioration does not exceed the quality deterioration threshold and the transmitter may be further adapted to retransmit the HARQ packet to the second device over the communication channel after reception of the response message if the response message comprises a non-acknowledgement.

A fifth aspect is an arrangement of a second device for wireless communication adapted to communicate with a first device for wireless communication over a communication channel in accordance with a hybrid automatic repeat request (HARQ) protocol.

The arrangement comprises a receiver, a transmitter and a control unit.

The receiver is adapted to receive a transmitted HARQ packet from the first device over the communication channel.

The control unit is adapted to determine whether a transmission is scheduled over the communication channel before transmission of a response message associated with the transmitted HARQ packet is scheduled.

The transmitter is adapted to (if no transmission is scheduled over the communication channel before transmission of the response message is scheduled) transmit a measurement signal to the first device over the communication channel for estimation by the first device of a quality of the communication channel.

The control unit may, according to some embodiments, comprise a determiner adapted to determine whether a transmission is scheduled over the communication channel before transmission of a response message associated with the transmitted HARQ packet is scheduled.

In some embodiments, the control unit may be further adapted to discard the response message associated with the transmitted HARQ packet if the receiver receives a retransmitted version of the HARQ packet before the response message associated with the transmitted HARQ packet is scheduled.

A sixth aspect is a wireless communication device comprising one or more of the arrangements of the fourth and fifth aspects. The wireless communication device may, for example, be a base station or a wireless communication terminal.

In some embodiments, the various (e.g. fourth and fifth) aspects may additionally have features identical with or corresponding to any of the various features as explained above for any of the other (e.g. first and second) aspects.

An advantage of some embodiments is that lower (average) latency may be achieved.

Another advantage of some embodiments is that the decision regarding whether or not to retransmit the HARQ packet before the response message is received is based on a trend in the signal quality rather than (direct or indirect) absolute values. A trend based decision process may provide a more accurate result, at least in some scenarios such as and adaptive coding and modulation scenario.

Yet another advantage of some embodiments is that a mechanism is provided, by means of the measurement signal, for the second quality estimation even if no data is to be transmitted by the second device before transmission of the response message.

BRIEF DESCRIPTION OF THE DRAWINGS

Further objects, features and advantages will appear from the following detailed description of embodiments, with reference being made to the accompanying drawings, in which:

FIG. 1 is a schematic drawing illustrating a scenario related to some embodiments;

FIG. 3 is a block diagram illustrating an example arrangement according to some embodiments; and FIG. 4 is a schematic drawing illustrating an example computer readable medium according to some embodiments.

DETAILED DESCRIPTION

Figure 2:
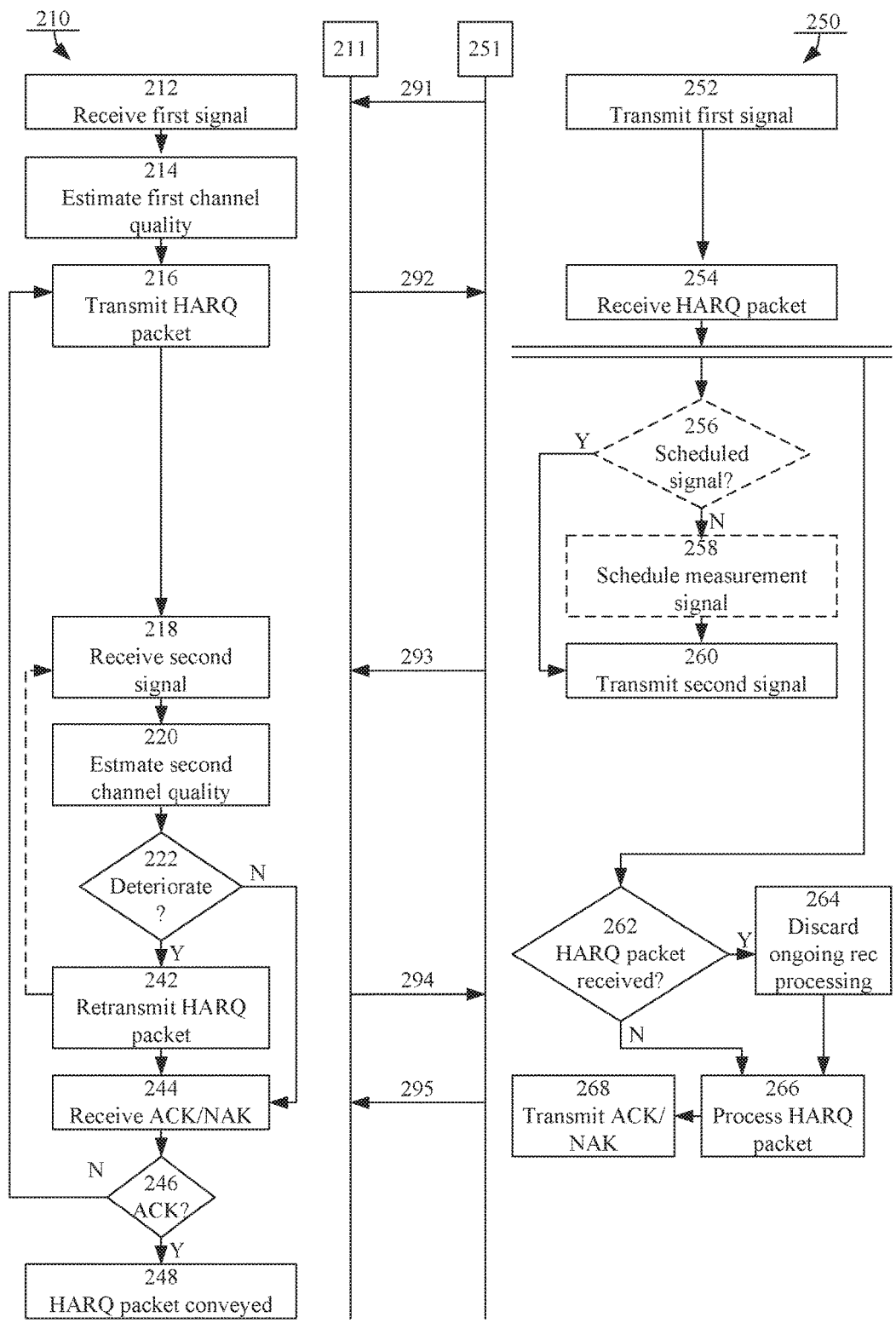
FIG. 2 is a combined flowchart and signaling diagram illustrating example method steps and signaling according to some embodiments.

In the following, embodiments will be described where the channel quality is estimated by a transmitting device before and after transmission of a HARQ packet, and where the HARQ packet is retransmitted before reception of a response message (ACK/NAK) associated with the HARQ packet if the channel quality has deteriorated (decreased) by an amount which exceeds a quality deterioration threshold.

Thus, the decision regarding whether or not to retransmit the HARQ packet before the response message is expected is based on the trend of the channel quality. If the trend is negative (and of a certain magnitude set by the threshold value) the HARQ packet is retransmitted before the response message is expected.

These embodiments provide an automatic system for determining whether or not to retransmit the HARQ packet before the response message is expected. In some embodiments, the transmitting device autonomously decides whether or not to retransmit the HARQ packet before the response message is expected.

FIG. 1 illustrates an example scenario where a HARQ packet is to be conveyed from a first device (e.g. base station) to a second device (e.g. terminal) over a communication channel with channel reciprocity (e.g. a TDD system using the same frequency interval for uplink (UL) and downlink (DL)).

Time runs from left to right in FIG. 1 and the two curves 120 and 130 illustrate two respective variations of the (estimated) quality of the communication channel over time.

In the uplink time window (e.g. time slot) 101, the first device receives a signal from the second device and estimates the quality 121, 131 based on the received signal. The received signal may be any suitable signal, for example, a measurement signal or a data transmission signal.

In the downlink time window 102, the first device transmits a HAW) packet 112 to the second device. The transmission format (e.g. coding, modulation, block length, etc.) of the HARQ packet 112 is based on the estimated quality 121, 131.

In the uplink time window 103 (while the HARQ packet 112 is processed by the second device), the first device receives another signal from the second device and estimates the quality 122, 132 again based on the newly received signal. As in the uplink time window 101, the received signal may be any suitable signal, for example, a measurement signal or a data transmission signal. In particular, in some embodiments the second device may ensure that a signal is transmitted in the uplink time window 103 even if it has no data scheduled for transmission.

Based on the quality estimations 121, 122, 131, 132, the first device may now determine whether or not the channel quality has deteriorated between the uplink time window 101 and the uplink time window 103.

If (as for the example 130) the quality estimations indicate that the channel quality is substantially unchanged or has improved between the uplink time window 101 and the uplink time window 103, then the first device may conclude that the transmission format used to transmit the HARQ packet 112 was probably sufficient to convey it correctly and the normal HARQ protocol may be followed. According to the normal HARQ protocol, the processing of the HARQ packet 112 by the second device results in transmission to the first device of a response message 115 (either an ACK or a NAK) which is received by the first device in uplink time window 105, and if the response message 115 comprised a NAK, the first device retransmits the HARQ packet 116 in downlink time window 106. The transmission format of the HARQ packet 116 may be based on a new quality estimation (e.g. based on a signal received in uplink time window 105) and/or based on an incremental redundancy approach and/or according to any other suitable approach.

If (as for the example 120) the quality estimations indicate that the channel quality has deteriorated between the uplink time window 101 and the uplink time window 103, then the first device may conclude that the transmission format used to transmit the HARQ packet 112 was probably not sufficient to convey it correctly. Thus, the second device will probably not be able to decode the HARQ packet 112 and a NAK response may be expected according to the normal HARQ protocol. In this case, the first device does not wait for the response message 115 but initiates an early retransmission 114 of the HARQ packet as soon as possible (in this case in downlink time window 104). The transmission format of the HARQ packet 114 may be based on the quality estimation 122, 132 of uplink time window 103 and/or based on an incremental redundancy approach and/or according to any other suitable approach.

FIG. 2 illustrates example methods 210, 250 and related signaling according to some embodiments. The methods 210, 250 may, for example, be used to implement the functionality explained in connection to FIG. 1.

The method 210 is performed by a first device (e.g. a base station) 211 for wireless communication adapted to communicate with a second device (e.g. a terminal) 251 for wireless communication—which performs the method 250—over a communication channel in accordance with a hybrid automatic repeat request (HARQ) protocol.

In step 252, the second device 251 transmits a first signal (e.g. a measurement signal or a data transmission signal) 291 over the communication channel, which is received by the first device 211 in step 212.

Based on the received first signal, the first device 211 estimates a first quality of the communication channel in step 214.

In step 216, the first device 211 transmits a HARQ packet 292 over the communication channel, which is received by the second device 251 in step 254. The first device 211 determines the transmission format of the HARQ packet 292 based on the estimation of the first quality of the communication channel.

In step 260, the second device 251 transmits a second signal (e.g. a measurement signal or a data transmission signal) 293 over the communication channel, which is received by the first device 211 in step 218.

In some embodiments, the second device 251 ensures that there is a second signal to transmit by means of optional steps 256 and 258. For example, this functionality may be activated in second devices requiring low latency. In step 256, the second device 251 determines whether or not there is already any signal scheduled for transmission to the first device 211. Preferably, such a signal should be scheduled for transmission as soon as possible, and definitely before transmission of a response message associated with the HARQ packet received in step 254 is scheduled.

If there is (Y-path out from step 256), the scheduled signal may act as the second signal in step 260. If there is no signal scheduled for transmission (N-path out from step 256), the second device 251 may schedule, in step 258, a measurement signal (e.g. with dummy data and/or comprising a pilot signal or other reference signal) to act as the second signal in step 260.

Based on the received second signal, the first device 211 estimates a second quality of the communication channel in step 220.

In step 222, the first device 211 determines whether or not a deterioration between the first quality and the second quality has occurred. For example, the first device may determine whether or not the deterioration exceeds a quality deterioration threshold.

The threshold value may be static or dynamic. The deterioration may be expressed as the first quality minus the second quality and the threshold value may be a positive value or a non-negative value. Of course numerous variations of the threshold value and how the deterioration is expressed exist (e.g. depending on what quality metric is applied). A few examples regarding the threshold value have been given above.

As mentioned above, a dynamic threshold value may be defined based on a current state or mode of a process that is controlled by data transmitted via the HARQ protocol. For example, an industrial robot controlled by the data transmitted via the HARQ protocol may have strict latency requirements when it is in a state where it operates in a high precision mode and/or operates at high speed while it may have less strict latency requirements in a low speed mode, a low precision mode, and/or in an idle mode. Such variation in latency requirements may translate to a corresponding variation in the threshold value strict latency requirement corresponding to a small deterioration triggering an early retransmission, and vice versa).

If there is no deterioration (or if the deterioration is not large enough) (N-path out from step 222) the method 210 proceeds to step 244 where the normal HARQ protocol is followed as will be described later.

If there is a (large enough) deterioration (Y-path out from step 222) the first device retransmits the HARQ packet 294 in step 242, which is before reception of a response message associated with the HARQ packet of step 216 may be expected. The transmission format of the retransmitted HARQ packet 294 may be based on the second quality estimation and/or based on an incremental redundancy approach and/or according to any other suitable approach. When the retransmission of step 242 is completed, the method 210 may either continue to step 244 (where the normal HARQ protocol is followed for the retransmission as will be described later) or steps 218, 220, and 222 may be repeated, depending on the implementation.

In parallel to transmitting the second signal in step 260, the second device 251 performs reception processing (e.g. demodulation, decoding, CRC, etc.) of the HARQ packet received in step 254.

If no retransmitted version 294 of the HARQ packet is received during this processing (N-path out from step 262) the HARQ packet received in step 254 is fully reception processed in step 266 and a response message 295 (ACK/NAK) associated with the HARQ packet received in step 254 is transmitted to the first device 211 in step 268.

If a retransmitted version 294 of the HARQ packet is received during this processing (Y-path out from step 262) the ongoing reception processing of the of the HARQ packet received in step 254 is discarded in step 264 and the retransmitted version of the HARQ packet 294 received in step 262 is reception processed instead in step 266 and a response message 295 (ACK/NAK) associated with the retransmitted version of the HARQ packet 294 received in step 262 is transmitted to the first device 211 in step 268.

In either case, the first device 211 receives the response message 295 in step 244. If the response message comprises an ACK (Y-path out from step 246) the first device 211 considers the HARQ packet to be conveyed to the second device 251 as illustrated by step 248. If the response message comprises a NAK (N-path out from step 246) the first device 211 retransmits the HAW) packet according to the normal HARQ protocol (if it has not already been transmitted the maximum number of times according to the HARQ process). The transmission format of the retransmitted HARQ packet may be based on a new quality estimation and/or based on an incremental redundancy approach and/or according to any other suitable approach. The retransmission according to the normal HARQ protocol is illustrated in FIG. 2 as the method 210 returning to step 216. However, in other implementations, steps 218, 220, 222, 242, 256, 258, 260, 262, and 264 may be discarded for retransmissions.

The determination of step 222 may be seen as a prediction (before reception of the associated response message) by the first device 211 of whether or not the HARQ packet transmitted in step 216 was received successfully by the second device 251. Due to channel reciprocity, a difference in the quality estimations of steps 214 and 218 strongly indicates that a corresponding difference compensated for the time difference) exists between the quality estimation of step 214 and the actual quality experienced by the HARQ transmission of step 216. Thus, a deterioration determined in step 222 may serve as a determination that the HARQ packet transmitted in step 216 was (probably) not received successfully by the second device 251.

FIG. 3 illustrates an example arrangement 300 according to some embodiments. The arrangement 300 may, for example, be comprised in any of a base station and a terminal. Furthermore, the arrangement 300 may, for example, be adapted to perform method steps of any of the methods 210 and 250 as described in connection with FIG. 2.

The arrangement 300 comprises a receiver and a transmitter (illustrated as a transceiver (RX/TX) 310 in FIG. 3) and a control unit (CU) 320.

The functionality of the arrangement 300 will now be described in the form of a first and second example. A combination of the first and second example is also possible according to some embodiments.

According to the first example, the arrangement 300 is for implementation in a first device for wireless communication adapted to communicate with a second device for wireless communication over a communication channel in accordance with a hybrid automatic repeat request (HARQ) protocol.

In the first example, the receiver is adapted to receive a first signal from the second device over the communication channel (compare with step 212 of FIG. 2), the control unit is adapted to estimate a first quality of the communication channel based on the received first signal (compare with step 214 of FIG. 2), and the transmitter is adapted to transmit a HARQ packet to the second device over the communication channel (compare with step 216 of FIG. 2), wherein a transmission format of the HARQ packet is based on the estimation of the first quality.

The receiver is further adapted to receive, after transmission of the HARQ packet, a second signal from the second device over the communication channel (compare with step 218 of FIG. 2).

The control unit is further adapted to estimate a second quality of the communication channel based on the received second signal (compare with step 220 of FIG. 2) and determine whether a deterioration between the first quality and the second quality exceeds a quality deterioration threshold (compare with step 222 of FIG. 2).

If the deterioration exceeds the quality deterioration threshold, the transmitter is further adapted to retransmit the HARQ packet to the second device over the communication channel (compare with step 242 of FIG. 2) before reception of a response message associated with the HARQ packet is expected (compare with step 244 of FIG. 2).

If the deterioration does not exceed the quality deterioration threshold, the receiver is further adapted to receive the response message (compare with step 244 of FIG. 2) and the transmitter is further adapted to retransmit the HARQ packet to the second device over the communication channel after reception of the response message if the response message comprises a non-acknowledgement.

The control unit may comprise a quality estimator (EST) 321 adapted to determine the first and second qualities and a determiner (DET) 322 adapted to determine whether or not the channel has deteriorated between the first and second quality estimations.

According to the second example, the arrangement 300 is for implementation in a second device for wireless communication adapted to communicate with a first device for wireless communication over a communication channel in accordance with a hybrid automatic repeat request (HARQ) protocol.

In the second example, the receiver is adapted to receive a transmitted HARQ packet from the first device over the communication channel (compare with step 254 of FIG. 2).

The control unit is adapted to determine whether a transmission is scheduled over the communication channel before transmission of a response message associated with the transmitted HARQ packet is scheduled (compare with step 256 of FIG. 2).

The transmitter is adapted to, if no transmission is scheduled over the communication channel before transmission of the response message is scheduled, transmit a measurement signal to the first device over the communication channel for estimation by the first device of a quality of the communication channel (compare with steps 258 and 260 of FIG. 2).

The control unit is further adapted to, if the receiver receives a retransmitted version of the HARQ packet before the response message associated with the transmitted HARQ packet is scheduled, discard the response message associated with the transmitted HARQ packet (compare with steps 262 and 264 of FIG. 2).

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a user equipment, a mobile telephone, a base station, a communicator, an electronic organizer, a smartphone, a computer, a notebook, or a mobile gaming device.

According to some embodiments, a computer program product comprises a computer readable medium such as, for example, a USB-stick, a plug-in card, an embedded drive, a diskette or a CD-ROM (as illustrated b 400 in FIG. 4). The computer readable medium may have stored thereon a computer program comprising program instructions. The computer program may be loadable into a data-processing unit (PROC) 420, which may, for example, be comprised in a mobile terminal or base station (410). When loaded into the data-processing unit, the computer program may be stored in a memory (MEM) 430 associated with or integral to the data-processing unit. According to some embodiments, the computer program may, when loaded into and run by the data-processing unit, cause the data-processing unit to execute method steps according to, for example, the methods shown in FIG. 2.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all nations that fall within the range of the claims are intended to be embraced therein.

The invention claimed is:

1. A method of a first device for wireless communication configured to communicate with a second device for wireless communication over a communication channel in accordance with a hybrid automatic repeat request (HARQ) protocol, the method comprising:
   receiving a first signal from the second device over the communication channel;
   estimating a first quality of the communication channel based on the received first signal;
   transmitting a HARQ packet to the second device over the communication channel, wherein a transmission format of the HARQ packet is based on the estimation of the first quality;
   receiving a second signal from the second device over the communication channel;
   estimating a second quality of the communication channel based on the received second signal;
   determining whether a deterioration between the first quality and the second quality exceeds a quality deterioration threshold; and
   if the deterioration exceeds the quality deterioration threshold, retransmitting the HARQ packet to the second device over the communication channel before reception of a response message associated with the HARQ packet is expected.

2. The method of claim 1, further comprising, if the deterioration does not exceed the quality deterioration threshold:
   receiving the response message; and
   retransmitting the HARQ packet to the second device over the communication channel after reception of the response message if the response message comprises a non-acknowledgement.

3. The method of claim 1, wherein at least one of the received first and second signals comprises a measurement signal.

4. The method of claim 1, wherein the communication channel is a frequency interval in a time division multiplex (TDD) system with channel reciprocity.

5. A method of a second device for wireless communication configured to communicate with a first device for wireless communication over a communication channel in accordance with a hybrid automatic repeat request (HARQ) protocol, the method comprising:
   receiving a transmitted HARQ packet from the first device over the communication channel;
   determining whether a transmission is scheduled over the communication channel before transmission of a response message associated with the transmitted HARQ packet is scheduled; and
   if no transmission is scheduled over the communication channel before transmission of the response message is scheduled, transmitting a measurement signal to the first device over the communication channel for estimation by the first device of a quality of the communication channel.

6. The method of claim 5, wherein the measurement signal is for estimation by the first device of a second quality of the communication channel to determine whether a deterioration between a first quality, estimated by the first device before transmission of the HARQ packet, and the second quality exceeds a quality deterioration threshold, wherein the quality deterioration threshold defines whether the first device retransmits the HARQ packet to the second device over the communication channel before reception of a response message associated with the HARQ packet is expected by the first device.

7. The method of claim 5, further comprising, if a retransmitted version of the HARQ packet is received before the response message associated with the transmitted HARQ packet is scheduled:
  discarding the response message associated with the transmitted HARQ packet; and
  transmitting a response message associated with the retransmitted version of the HARQ packet.

8. The method of claim 5, wherein the communication channel is a frequency interval in a time division multiplex (TDD) system with channel reciprocity.

9. A nontransitory computer readable storage medium, having thereon a computer program comprising program instructions, the computer program being loadable into a data-processing unit and configured to cause execution of a method when the computer program is run by the data-processing unit, wherein the method is a method of a first device for wireless communication configured to communicate with a second device for wireless communication over a communication channel in accordance with a hybrid automatic repeat request (HARQ) protocol, and wherein the method comprises:
  receiving a first signal from the second device over the communication channel;
  estimating a first quality of the communication channel based on the received first signal;
  transmitting a HARQ packet to the second device over the communication channel, wherein a transmission format of the HARQ packet is based on the estimation of the first quality;
  receiving a second signal from the second device over the communication channel;
  estimating a second quality of the communication channel based on the received second signal;
  determining whether a deterioration between the first quality and the second quality exceeds a quality deterioration threshold; and
  if the deterioration exceeds the quality deterioration threshold, retransmitting the HARQ packet to the second device over the communication channel before reception of a response message associated with the HARQ packet is expected.

10. An arrangement of a first device for wireless communication configured to communicate with a second device for wireless communication over a communication channel in accordance with a hybrid automatic repeat request (HARQ) protocol, the arrangement comprising a receiver, a transmitter and a control unit,
  the receiver configured to receive a first signal from the second device over the communication channel;
  the control unit configured to estimate a first quality of the communication channel based on the received first signal;
  the transmitter configured to transmit a HARQ packet to the second device over the communication channel, wherein a transmission format of the HARQ packet is based on the estimation of the first quality;
  the receiver further configured to receive, after transmission of the HARQ packet, a second signal from the second device over the communication channel;
  the control unit further configured to:
    estimate a second quality of the communication channel based on the received second signal; and
    determine whether a deterioration between the first quality and the second quality exceeds a quality deterioration threshold; and
  the transmitter further configured to, if the deterioration exceeds the quality deterioration threshold, retransmit the HARQ packet to the second device over the communication channel before reception of a response message associated with the HARQ packet is expected.

11. The arrangement of claim 10, wherein:
  the receiver is further configured to, if the deterioration does not exceed the quality deterioration threshold, receive the response message; and
  the transmitter is further configured to retransmit the HARQ packet to the second device over the communication channel after reception of the response message if the response message comprises a non-acknowledgement.

12. The arrangement of claim 10, wherein at least one of the received first and second signals comprises a measurement signal.

13. The arrangement of claim 10, wherein the communication channel is a frequency interval in a time division multiplex (TDD) system with channel reciprocity.

14. An arrangement of a second device for wireless communication configured to communicate with a first device for wireless communication over a communication channel in accordance with a hybrid automatic repeat request (HARQ) protocol, the arrangement comprising a receiver, a transmitter and a control unit,
  the receiver configured to receive a transmitted HARQ packet from the first device over the communication channel;
  the control unit configured to determine whether a transmission is scheduled over the communication channel before transmission of a response message associated with the transmitted HARQ packet is scheduled; and
  the transmitter configured to, if no transmission is scheduled over the communication channel before transmission of the response message is scheduled, transmit a measurement signal to the first device over the communication channel for estimation by the first device of a quality of the communication channel.

15. The arrangement of claim 14, wherein the measurement signal is for estimation by the first device of a second quality of the communication channel to determine whether a deterioration between a first quality, estimated by the first device before transmission of the HARQ packet, and the second quality exceeds a quality deterioration threshold, wherein the quality deterioration threshold defines whether the first device retransmits the HARQ packet to the second device over the communication channel before reception of a response message associated with the HARQ packet is expected by the first device.

16. The arrangement of claim 14, wherein:
  the control unit is further configured to, if the receiver receives a retransmitted version of the HARQ packet before the response message associated with the transmitted HARQ packet is scheduled, discard the response message associated with the transmitted HARQ packet.

17. The arrangement of claim 14, wherein the communication channel is a frequency interval in a time division multiplex (TDD) system with channel reciprocity.

18. The arrangement of claim 10, wherein the arrangement is comprised in a wireless communication device.

19. The arrangement of claim 14, wherein the arrangement is comprised in a wireless communication device.

* * * * *